Jan. 24, 1928.

B. F. FITCH 1,657,076

FREIGHT HANDLING APPARATUS

Filed Oct. 22. 1924

6 Sheets-Sheet 1

Inventor

Benjamin F. Fitch

By Bates, Macklin, Goldrick & Kerr

Attorneys

Jan. 24, 1928.　　　　　B. F. FITCH　　　　　1,657,076
FREIGHT HANDLING APPARATUS
Filed Oct. 22, 1924　　　6 Sheets-Sheet 2

Inventor
Benjamin F. Fitch
By Bates, Macklin, Goodrich & Kerr
Attorneys

Jan. 24, 1928.

B. F. FITCH 1,657,076

FREIGHT HANDLING APPARATUS

Filed Oct. 22, 1924        6 Sheets-Sheet 3

Inventor
Benjamin F. Fitch,
By Bates Macklin Goodrich Nevin
Attorneys

Jan. 24, 1928.

B. F. FITCH 1,657,076

FREIGHT HANDLING APPARATUS

Filed Oct. 22, 1924   6 Sheets-Sheet 4

Inventor

Benjamin F. Fitch,

By Bates Macklin Goodrich & Peary

Attorneys

Jan. 24, 1928.                                                         1,657,076
B. F. FITCH
FREIGHT HANDLING APPARATUS
Filed Oct. 22, 1924                6 Sheets-Sheet 5

Inventor
Benjamin F. Fitch
By Baker, Macklin, Goldrick & Pear
Attorneys

Jan. 24, 1928.  1,657,076
B. F. FITCH
FREIGHT HANDLING APPARATUS
Filed Oct. 22, 1924    6 Sheets—Sheet 6
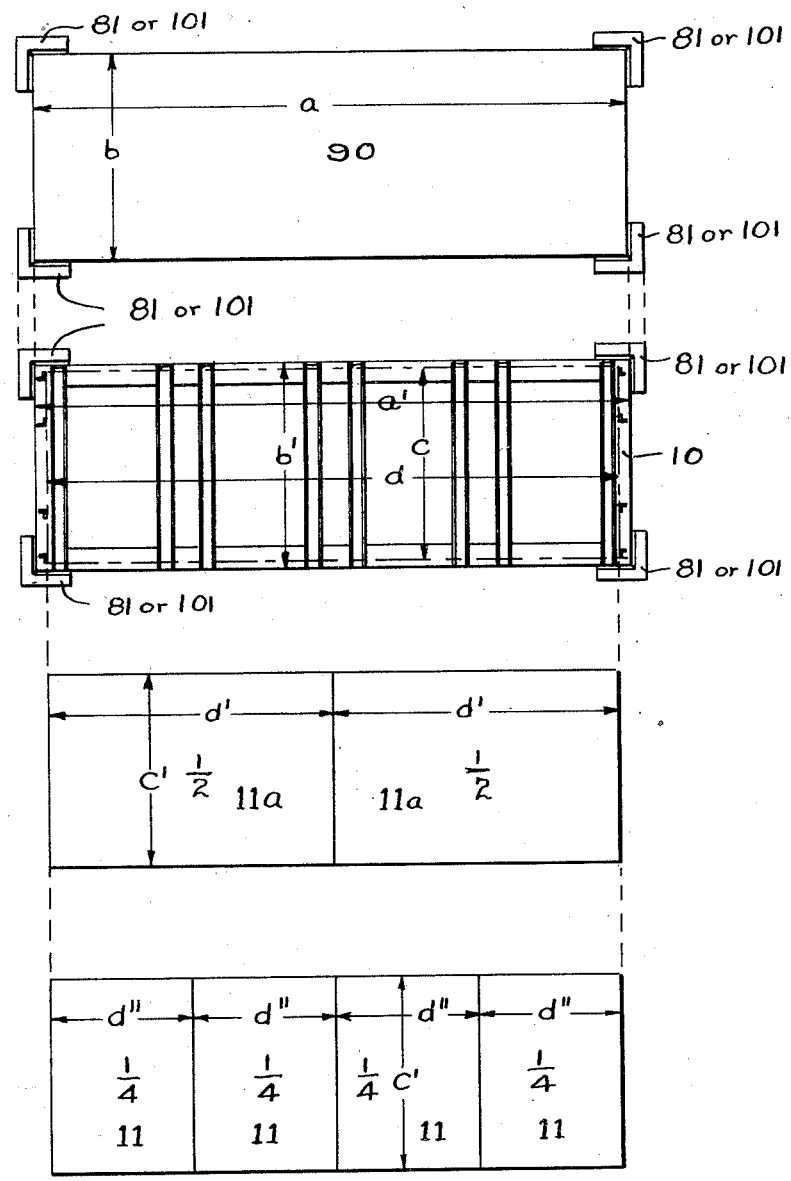
FIG.—14
Inventor
Benjamin F. Fitch,
By Baker, Macklin, Goldrick & Tear
Attorneys Patented Jan. 24, 1928.

1,657,076

UNITED STATES PATENT OFFICE.

BENJAMIN F. FITCH, OF GREENWICH, CONNECTICUT.

FREIGHT-HANDLING APPARATUS.

Application filed October 22, 1924. Serial No. 745,076.

This invention relates to apparatus for handling freight which is loaded into containers and is adapted to be transported either by automobile truck, or by freight car. The use of removable automobile bodies as containers for package freight delivered as a unit to or from a store door has many advantages, but in many instances there is not sufficient freight either at the point of origin, or of delivery to the consignee, to fill an entire truck body, nor is there proper crane equipment for raising such body.

One of the objects of the present invention therefore is the provision of means for permitting the transfer of small containers to a truck frame without requiring the use of overhead hoisting and transporting equipment either at the point of origin or delivery. In this connection, however, my invention contemplates an arrangement for enabling such small containers to be readily handled and transported in groups as a unit at transfer stations which are equipped with overhead hoisting and transporting mechanism, with a resulting saving of time.

In accomplishing the above object, I provide a skeleton tray adapted to receive and support a plurality of sectional containers, the tray having means for attachment of lifting mechanism, so that the tray and containers may be lifted as a unit. The external dimensions of such a tray with a set of containers thereon corresponds to the external dimensions of a standard single container so that the same positioning means of an automobile truck or on a railway car may hold either the standard single container or the tray with a plurality of containers. This is also a feature of my invention.

Figure 1:
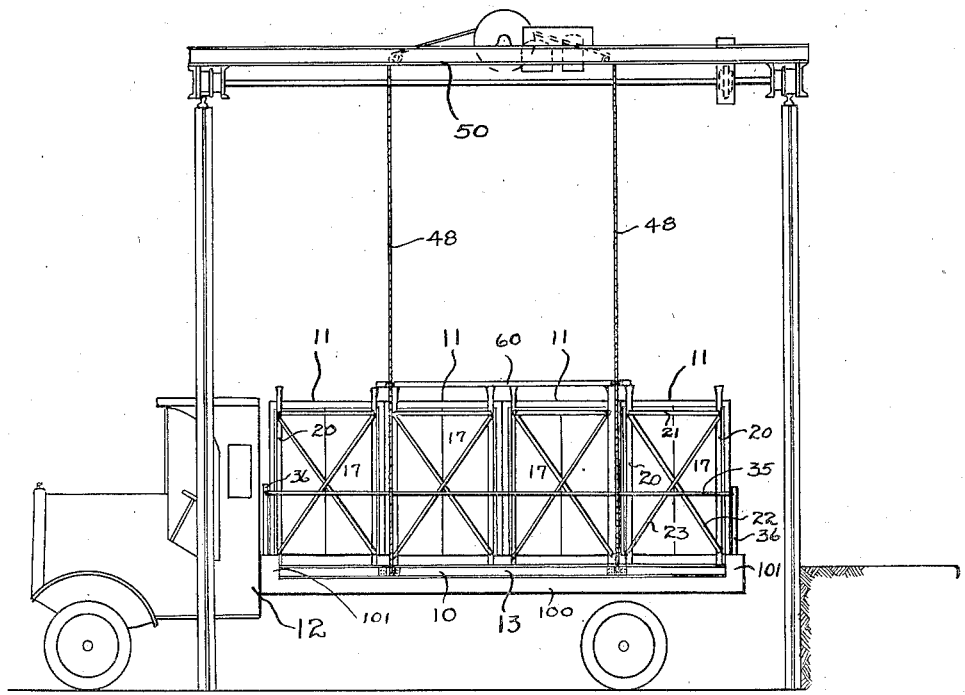
Figure 2:
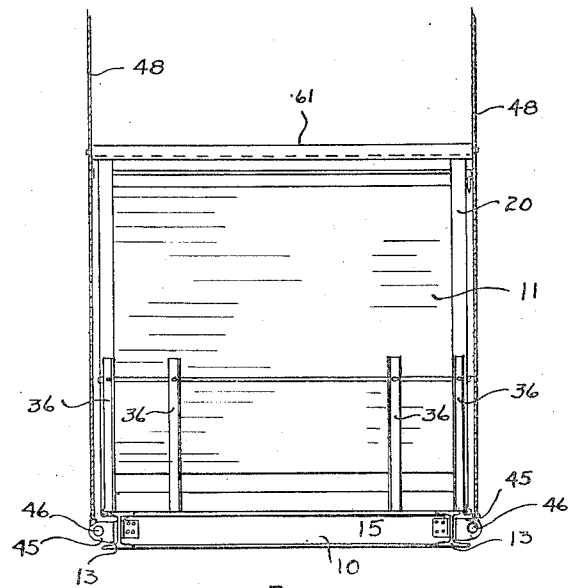
Figure 3:
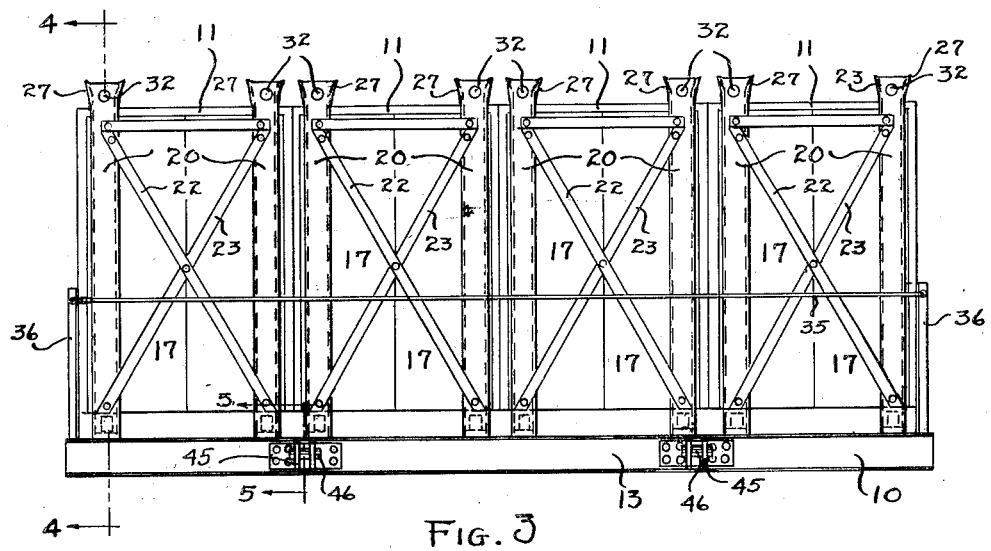
Figures 4, 5:
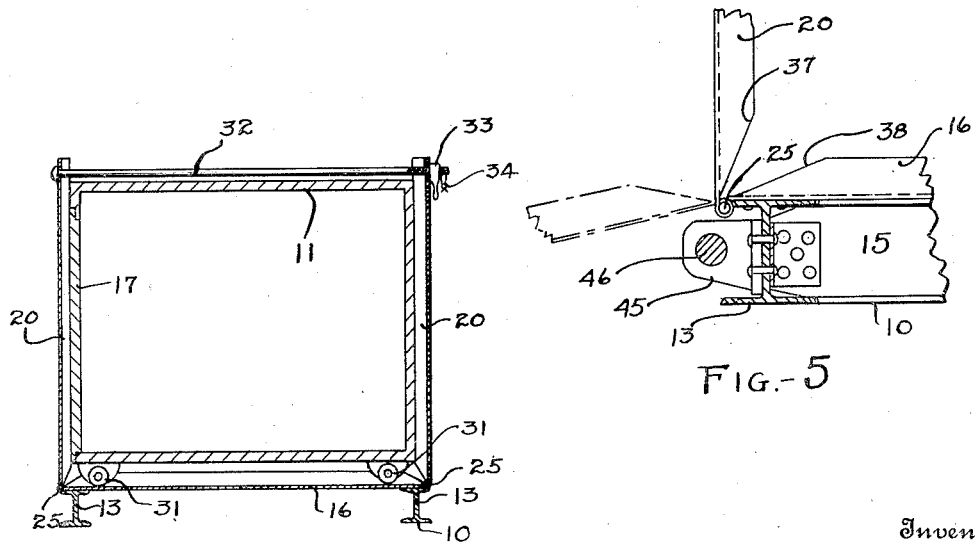
Figure 6:
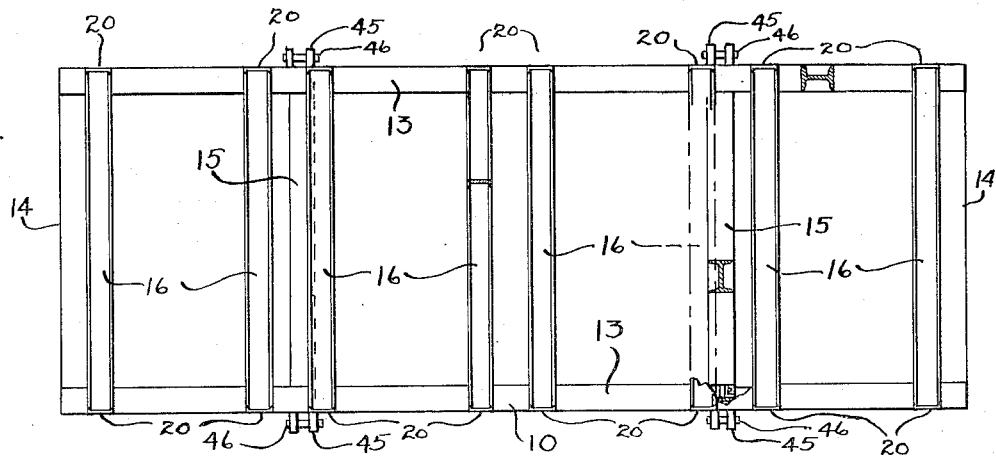
Figure 9:
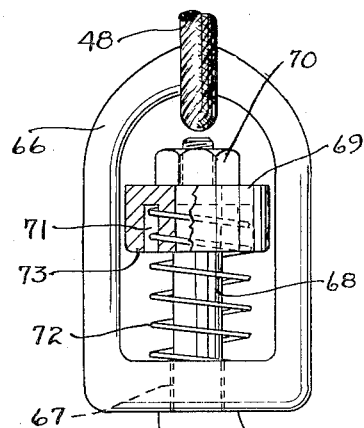
Figure 8:
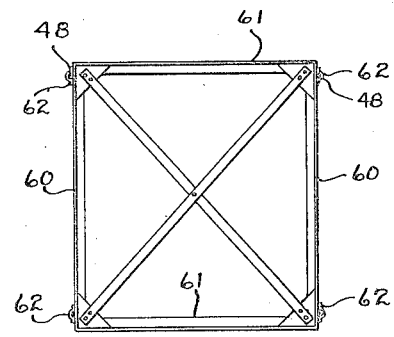
Figure 7:
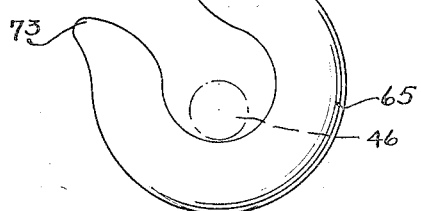
Figure 10:
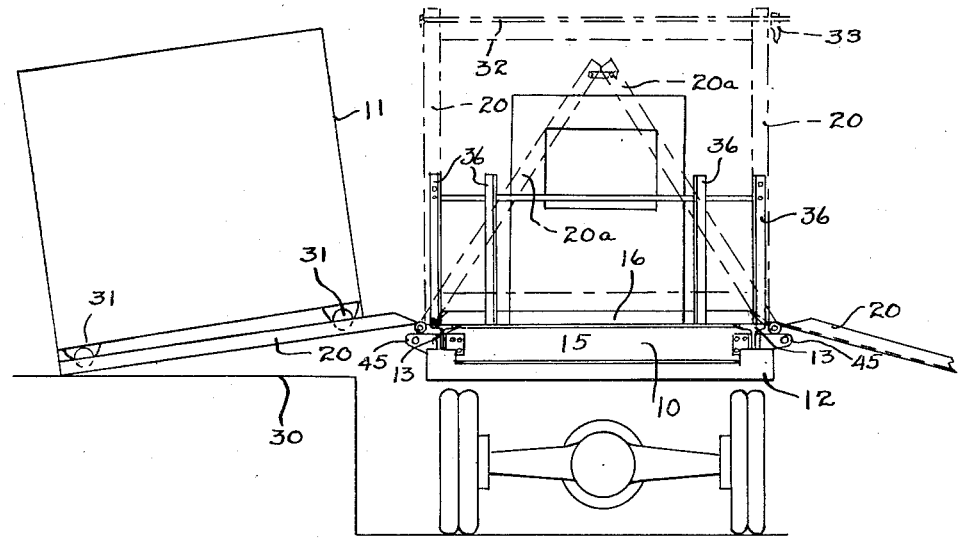
Figure 11:
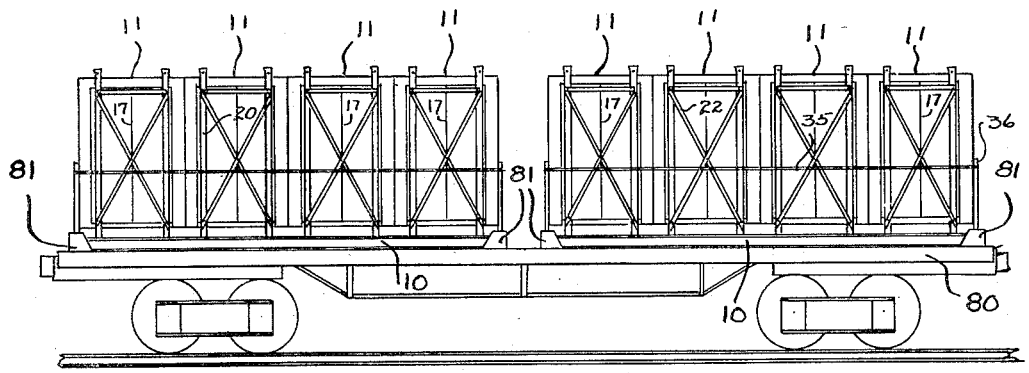
Figure 12:
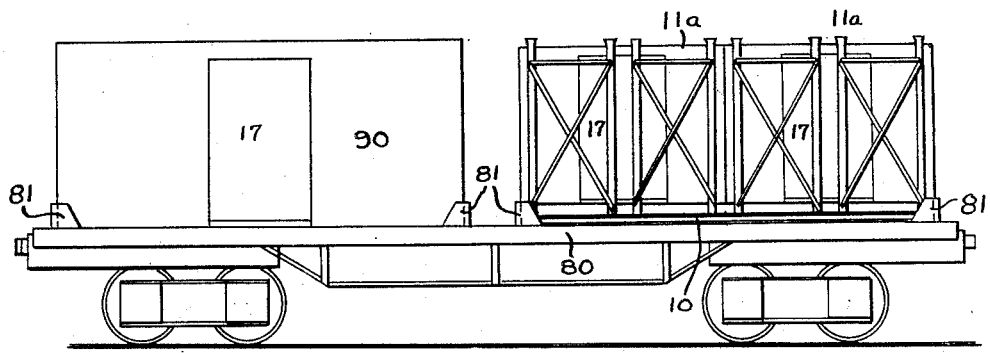
Figure 13:
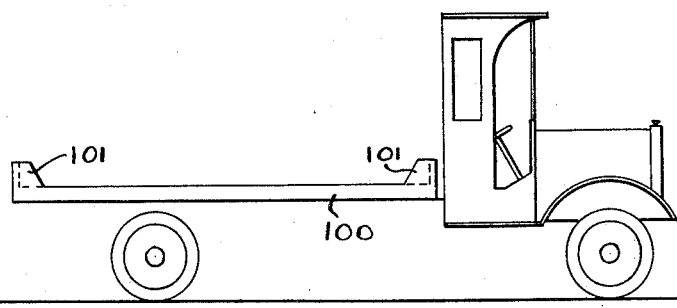

A preferred arrangement for carrying out my invention is illustrated in the drawings, wherein Fig. 1 is a side elevation of a motor vehicle having sectional containers mounted on a tray thereon and showing an overhead hoisting mechanism in position for raising the tray with its group of containers as a unit from the truck; Fig. 2 is an end elevation of the tray suspended by hoisting means; Fig. 3 is a side elevation of the tray having containers thereon; Figs. 4 and 5 are sections taken on the lines 4—4 and 5—5 respectively in Fig. 3; Fig. 6 is a plan view of the tray with the containers removed therefrom; Fig. 7 is a side elevation showing part of a pair of idle opposite gates and illustrating a detachable connection therebetween; Fig. 8 is a plan view of a frame employed for maintaining the cables in proper spaced relationship; Fig. 9 is a side elevation partly in section and on a larger scale showing one form of yieldable connection between the load engaging member and the supporting cable therefor; Fig. 10 is an end view of the tray on a motor vehicle with one of the tray gates lowered to provide a ramp for a container which is being transferred between the truck and platform; Fig. 11 is a side elevation of a freight car showing containers grouped thereon for transportation purposes; eight sectional containers being shown in groups of four on two trays; Fig. 12 is a similar side elevation showing one standard container on a flat car and one tray carrying two containers, each of twice the width of the containers shown in Fig. 11; Fig. 13 is a side elevation of a truck equipped with positioning means for holding either a single full-sized container or a tray with sectional containers thereon; Fig. 14 is a diagram illustrating the interchangeability on a car or truck of a full-sized container or a tray adapted to receive two approximately one-half sized containers or a larger number of smaller sized containers.

My invention is shown in connection with a tray 10 which is arranged to support a plurality of containers 11 and to be positioned upon a truck, indicated at 12. The tray may comprise a rectangular frame having longitudinal members 13 which are connected at the ends by transverse members 14 and intermediately by reinforcing beams 15. The longitudinal and transverse members as well as the reinforcing beams are preferably I-beams which may be secured together in any convenient or conventional manner. Resting on the longitudinal beams and extending transversely of the tray, I provide a plurality of trackways in accordance with the number of containers to be carried by the tray.

The tray as shown in the drawings is intended for supporting either four approximately quarter sized containers or two approximately one-half sized containers, and I have accordingly equipped each tray with four pairs of tracks indicated at 16, all of which are utilized when four containers are on the tray, while intermediate ones are idle when the tray carries only two containers. Each track is preferably a channel-shaped member, the base of which is rigidly attached to the longitudinal member 13 and the flanges of which extend upwardly to provide guides for the associated containers.

To facilitate the transference of a container between the truck and the platform and from either side of the truck, I have shown members or gates on each side of the tray and pivotally connected thereto. In the preferred form each gate comprises channel-shaped members 20 which are connected by members 21, 22 and 23 for maintaining the members 20 in adjusted position. As shown in Fig. 5, each gate is pivotally connected as at 25, to the track members on the tray. This pivotal connection is such that whenever a tray is moved downwardly then the members 20, are disposed in alignment with the members 16. If a truck, for example as shown in Fig. 10, is disposed adjacent the platform 30, then a container having wheels 31 thereon may be readily transferred between the platform and the truck, since the gate then functions as a ramp along which the container can be rolled.

To enable the containers to be readily rolled off or onto a lowered gate, without being in strict alignment therewith, I prefer to flare the side walls of the channel trackways at their extreme ends as shown particularly at 27, in Fig. 3.

To prevent outward movement of any of the gates when a truck is loaded, I provide means for locking the gate in upright position. One form of means for accomplishing this is shown in Fig. 4 wherein a bar 32 extends from the gate on one side of the container to the gate on the opposite side thereof. A nut 33 may then engage the member 32 to clamp the gates together.

This clamping device also provides convenient means for sealing the containers. If the containers have their doors 17 in their ends, the upstanding gates 20 will overlie these doors and prevent opening them so long as the gates are held in this position. By passing the wire of the usual car seal 34, Fig. 4, through an opening in the end portion of the tie rod 32, the lowering of the gate cannot be effected without destroying the seal, and thus the containers are maintained sealed in the same manner as that employed for box cars.

Frequently the gate on only one side is to be lowered for permitting removal or installation of a container, and accordingly means are provided to prevent the gate on the opposite side of the container from falling downwardly. I have shown for this purpose a cable 35 which extends longitudinally of the tray on each side thereof for engaging the outer side of the gates. The cables may be detachably anchored in any convenient manner to posts 36 which may extend upwardly and be rigidly attached to the trays. Thus a gate on any one side may be lowered without danger of the gate on the opposite side falling outwardly. Moreover the gate on either side may be lowered to the exclusion of the gate on the other side.

To prevent the gates from moving about their pivotal connection, whenever they are not being employed for holding a container upon the truck, I have illustrated the flanges of the members 20 as having a relief 37 and the flanges of the member 16 as having a relief 38. This permits a gate to be swung inwardly over the truck as shown by the broken lines 20ª in Fig. 10. In such position, the tops of the oppositely disposed gates may engage each other and be locked together in any convenient manner. For example in Fig. 7, I have shown a latch 40 which is pivotally mounted at 41 on one gate and is adapted to engage a projection 42 on an opposing gate.

To permit a number of containers to be raised as a group or unit, I have shown the longitudinal members of the frame as having brackets 45 rigidly secured to the outer side thereof. Each bracket may support a member 46. As shown in Figs. 1 and 2, the members 46 lie outside the containers, wherefore they may be engaged by hoisting cables 48 which depend from an overhead traveling crane indicated in general at 50. The brackets as illustrated in Fig. 6 are in alignment with the reinforcing means 15, in order to transmit lifting stresses directly through the reinforcing means.

To maintain the cables in proper spaced relationship, I have illustrated in Figs. 1, 2 and 8, a cradle, having longitudinal members 60 and transverse members 61 which are arranged to be disposed between the cables and to be rigidly attached thereto. For this purpose I may employ clamps 62 which function to lock the cables to the cradle at a point above the top of the containers. Thus the cables may be lowered with the cradle until the ends thereof are in position to permit engagement with the members 46 on the tray. The cradle is therefore free from load stresses and is adapted only to facilitate the engagement of the cables with the tray.

To permit the individual cables to be brought into engagement with the tray in an expeditious manner, I have shown a yieldable connection in Fig. 9 between the cable and the load engaging hook 65. This connection may comprise a yoke 56 carried by the cable, which yoke has an opening 67 through which the shank 68 of the hook may extend. The upper end of the shank has a collar 69 which is rigidly mounted on the shank, and which may be held in position thereon by means of a nut 70. The collar as shown has a recess 71 while a light spring 72 surrounds the shank and has one end thereof engaging the collar within the recess, and has the other end thereof engaging the yoke. The spring 72 functions to urge the hook toward the cable. This characteristic is utilized for holding the hook in engagement with a member 46. To effect such engagement the cables are lowered until the point 73 of the hook is approximately in a horizontal plane with the top of the member 46. Thereupon the hook may be manually lowered by compressing the spring until the hook is brought below the member 46, whereupon it is forced inwardly and released. As soon as the cables are raised after the tray is engaged, then the spring 72 is compressed until it enters the recess 71, whereupon the lower face 73 of the collar engages the yoke so as to transmit lifting stresses directly from the cables to the hook without placing any stress upon the spring.

In Fig 11, I have shown the adaptability for my invention to railway cars for transportation purposes, wherein a railway car indicated at 80 may have abutments 81 for guiding a tray and maintaining it in proper position with reference to the car. The transfer from a truck to a railway car may therefore be accomplished by lifting a loaded tray as a unit.

Fig. 11 shows two trays, each with four containers, on a flat car, while Fig. 12 shows a similar flat car 80 having the same abutments 81 carrying one full sized standard container 90 resting directly on the car without a tray and two approximately one-half sized containers 11ᵃ carried on a tray 10 which is mounted on the other half of the car. Comparison of these two figures illustrates the adaptability of my system. This is further illustrated by Fig. 13 which shows at 100 a truck equipped with suitable corner pockets 101 adapted to receive either the standard container 90 or the tray 10 with its sectional containers.

The interchangeability resulting from my system is further illustrated in the diagram 14, wherein the full sized standard container 90 having horizontal dimenions $a$ and $b$ is shown as mounted in the corner pockets 81 and 101 of a car or truck. Directly below this on the sheet is illustrated a tray 10 mounted in the same corner pockets and having external dimensions $a'$ and $b'$ which are the same as the dimensions $a$ and $b$ of the standard container. Below this tray, I have illustrated two one-half sized containers 11ᵃ, each of which has a width $c'$ corresponding to the internal width $c$ of the tray 10, and a length $d'$ corresponding to one-half the internal length $d$ of the tray. At the bottom of the diagram is illustrated four quarter-sized containers 11 having the same width as $c'$ and having a length $d''$ which is substantially one-half the container length $d'$ and substantially one-quarter the length $d$ of the tray. In practice, these relative dimensions of the sectional containers are made somewhat scant so as to allow ready fitting adjacent each other on the tray as will be well understood.

By my invention, the trucks and cars may be equipped for carrying full sized containers, which are desirable where large loads are shipped from one point of origin to the the same destination. At the same time, by means of my tray and sectional containers, the same truck and car equipment may be used for store-door loading or delivery or where the loads to a given point would not fill a full sized container. While I have illustrated the tray as carrying as many as four containers, it is to be understood that the size of containers may be materially decreased and their number correspondingly increased.

I have shown the containers equipped with wheels on fixed axis enabling them to be readily rolled on or off the tray, but the containers may have caster wheels if desired for enabling more readily rolling on stataion platforms. The containers may be rolled on or off the mounted tray by hand power, with the assistance usually of a block and tackle, but any suitable mechanism may be employed for rolling them to or from position.

An advantage of my invention as will be apparent from the foregoing description, is the fact that a motor truck may carry a various number of containers upon a tray, and that all of the containers may be raised and transported as a unit from the truck at a central distributing point. Moreover it will be apparent that by utilizing small containers in groups and by employing an individual ramp for each container that a truck may be readily loaded at a shipping point or unloaded at a discharging point for store door delivery without requiring hoisting and transporting mechanism.

By arranging the gates as heretofore described, I provide adequate means for maintaining the containers in proper position upon the truck and for sealing them, and by employing a yieldable connection between the cable and the load engaging hook, I facilitate the engagement between the hoisting mechanism and the tray without requiring the services of more than one man.

Having thus described my invention, I claim:

1. A portable frame having thereon a plurality of transverse tracks adapted to receive and hold wheeled containers, means on the frame for enabling it to be raised and transported, spaced members hinged to the frame and extending above the top of the container, and means extending across the top of the container and adapted to connect the members for locking them in place upon the frame.

2. A portable frame having trackways thereon adapted to receive a container, a member pivotally mounted on the frame on each side of the container, said members being adapted when in upright position to extend above the top of the container, and when in lowered position to provide a ramp for enabling the container to be transported laterally with reference to the frame, and means connecting the members above the top of the container for holding it in position upon the frame.

3. A portable frame having channel-shaped members carried thereby and providing a trackway thereon, said trackway being adapted to receive a wheeled container, other channel shaped members hinged to the frame and adapted when in lowered position to provide a continuation of said trackways, said hinged members having such length that they extend above the container when in upright position, and separable means extending across the top of the container and engaging the hinged members for locking them together and holding the container in place upon the frame.

4. A portable frame having a plurality of transversely extending trackways thereon, each adapted to receive a container, members hinged to the frame and adapted when in one position to provide a continuation of the trackways, and when in another position to extend alongside a container positioned on the trackway, and means associated with the frame for enabling the frame and containers thereon to be raised as a unit.

5. A portable frame having a trackway extending transversely thereof, members hinged to the frame and adapted when in lowered position to align with the trackway on the frame, whereby the members provide a ramp along which the container may be moved onto the trackway, means for locking the members together when the container is positioned on the trackway, and other means for locking the members together when the container is removed from the frame.

6. A portable frame having members hinged thereto on opposite sides thereof, said members being adapted to be swung upwardly and downwardly and to provide a ramp along which a container may be moved, said members being also adapted to be swung inwardly along the frame when there is no container thereon, and means connecting the members for locking them together when in the last mentioned position.

In testimony whereof, I hereunto affix my signature.

BENJAMIN F. FITCH.